(12) United States Patent
Hirabayashi et al.

(10) Patent No.: US 10,921,144 B2
(45) Date of Patent: Feb. 16, 2021

(54) NAVIGATION APPARATUS

(71) Applicant: PIONEER CORPORATION, Tokyo (JP)

(72) Inventors: Daisuke Hirabayashi, Kawagoe (JP); Kazuo Murata, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 207 days.

(21) Appl. No.: 16/088,368

(22) PCT Filed: Mar. 29, 2016

(86) PCT No.: PCT/JP2016/060086
§ 371 (c)(1),
(2) Date: Sep. 25, 2018

(87) PCT Pub. No.: WO2017/168553
PCT Pub. Date: Oct. 5, 2017

(65) Prior Publication Data
US 2020/0256688 A1  Aug. 13, 2020

(51) Int. Cl.
 *G01C 21/34* (2006.01)
 *G01C 21/36* (2006.01)

(52) U.S. Cl.
 CPC ..... *G01C 21/3461* (2013.01); *G01C 21/3415* (2013.01); *G01C 21/3492* (2013.01); *G01C 21/3617* (2013.01)

(58) Field of Classification Search
 CPC ............ G01C 21/3461; G01C 21/3617; G01C 21/3415; G01C 21/3492
 See application file for complete search history.

(56) References Cited

U.S. PATENT DOCUMENTS 6,175,803 B1    1/2001  Chowanic et al.
6,615,133 B2 *  9/2003  Moskowitz ........ G01C 21/3484
                                          340/905

(Continued)

FOREIGN PATENT DOCUMENTS

JP    2000055690 A    2/2000
JP    2004045291 A    2/2004

(Continued)

OTHER PUBLICATIONS

Notice of Reasons for Refusal for related JP App No. 2018-507872 dated Jun. 17, 2019, 4 pgs.

(Continued)

*Primary Examiner* — Michael J Zanelli
(74) *Attorney, Agent, or Firm* — Procopio, Cory, Hargreaves & Savitch LLP

(57) ABSTRACT

Provided is a navigation apparatus with which a user or the like is able to be aware of an avoidance recommended region or the like on a route and is also able to be aware of specific avoidance recommendation property. With a navigation apparatus, a route search portion searches a route to a destination, and a communication control portion acquires avoidance recommended region information from an avoidance recommended region database that stores the avoidance recommended region information acquired from a server. Furthermore, based on the avoidance recommended region on the route searched by the route search portion, the indication portion indicates the presence of the avoidance recommended region on the route.

10 Claims, 11 Drawing Sheets

(56) References Cited

U.S. PATENT DOCUMENTS

| | | | |
|---|---|---|---|
| 8,290,705 B2* | 10/2012 | Trinko | G01C 21/367 |
| | | | 340/995.1 |
| 2007/0040705 A1 | 2/2007 | Yoshioka et al. | |
| 2010/0036610 A1 | 2/2010 | Urciuoli et al. | |
| 2012/0179363 A1* | 7/2012 | Pierfelice | G01C 21/3461 |
| | | | 701/423 |
| 2017/0059344 A1* | 3/2017 | Rothschild | G01C 21/3667 |
| 2017/0131115 A1* | 5/2017 | Park | G06Q 50/265 |

FOREIGN PATENT DOCUMENTS

| | | | |
|---|---|---|---|
| JP | 2007-51973 A | | 3/2007 |
| JP | 2007255992 A | | 10/2007 |
| JP | 2009-145060 A | | 7/2009 |
| JP | 2009-258025 A | | 11/2009 |
| JP | 2009540329 A | | 11/2009 |
| JP | 2012-202890 | * | 10/2012 |

OTHER PUBLICATIONS

International Search Report and Written Opinion of the International Searching Authority for related International Application No. PCT/JP2016/060086, dated May 31, 2016; 5 page.

* cited by examiner

| LEVEL 2 | FREQUENT CRIME AND ACCIDENT |
| --- | --- |
| LEVEL 1 | FREQUENT CRIME OR ACCIDENT |
| LEVEL 0 | NORMAL LEVEL (NON-DANGEROUS REGION) |

NAVIGATION APPARATUS

CROSS-REFERENCE TO RELATED APPLICATIONS

This application is a U.S. National Stage entry of PCT Application No: PCT/JP2016/060086 filed Mar. 29, 2016, the contents of which are incorporated herein by reference.

TECHNICAL FIELD

The present invention relates to a navigation apparatus for searching a route.

BACKGROUND ART

The navigation apparatus, when a destination or the like is input, searches a route to the destination or the like and guides a user or the like. Thus, even if being unfamiliar with the geography to a vicinity of the destination or the destination, the user or the like can easily reach the destination.

However, when the destination is an area where a crime, e.g., theft, frequently occurs, the necessity of giving consideration to, for example, theft may arise.

Patent Literature 1 describes that, when a parking lot in the vicinity of a destination is retrieved, the safety of a parking place is assessed from data about the positions of previously generated crimes, and the results of the safety assessment are indicated to the user, so that the user is guided to a safe parking lot where a crime is unlikely to occur.

CITATION LIST

Patent Literature

Patent Literature 1: JP 2009-258025 A

SUMMARY OF INVENTION

Technical Problem

In the case of Patent Literature 1, because the purpose is to avoid a crime that occurs during parking, the subject is a destination, and in cases where there is an avoidance recommended region on a route, such as an area where a crime, e.g., theft, frequently occurs or an area where a traffic accident frequently occurs, the user or the like is not able to be aware of the fact.

Thus, in view of the aforementioned problem, it is an object of the present invention to provide, for example, a navigation apparatus with which the user or the like is able to be aware of an avoidance recommended region or the like on a route and is also able to be aware of specific detailed information.

Solution to Problem

In order to solve the aforementioned problem, the invention stated in a first aspect of the present invention is a navigation apparatus including a searching device for searching a route, an avoidance recommended region acquisition device for acquiring information about an avoidance recommended region, which is a region for which avoidance of passing is recommended, and a reporting device for reporting the presence of the avoidance recommended region on the route searched by the searching device on the basis of the avoidance recommended region acquired by the avoidance recommended region acquisition device.

The invention stated in a second aspect of the present invention is an information processing device including a searching device for searching a route, an avoidance recommended region acquisition device for acquiring information about an avoidance recommended region, which is a region for which avoidance of passing is recommended, a report information generation device for generating report information indicating the presence of the avoidance recommended region on the route searched by the searching device on the basis of the avoidance recommended region acquired by the avoidance recommended region acquisition device, and an output device for outputting the report information generated by the report information generation device to the outside.

The invention stated in a fourth aspect of the present invention is an information report device including a receiving device for receiving report information indicating the presence of an avoidance recommended region on a route on the basis of the avoidance recommended region, which is a region for which avoidance of passing is recommended on the searched route, and a reporting device for reporting the report information received by the receiving device.

The invention stated in a fifth aspect of the present invention is an information reporting method for a navigation apparatus including a search process for searching a route, the information reporting method including an avoidance recommended region acquisition process for acquiring information about an avoidance recommended region, which is a region for which avoidance of passing is recommended, and a report process for reporting the presence of the avoidance recommended region on the route searched by the search process on the basis of the avoidance recommended region acquired by the avoidance recommended region acquisition process.

The invention stated in a sixth aspect of the present invention is an information report program in which the information reporting method stated in the fifth aspect is carried out by a computer.

The invention stated in a seventh aspect of the present invention is a computer-readable recording medium that stores the information report program stated in the sixth aspect.

DESCRIPTION OF EMBODIMENTS

Figure 1:
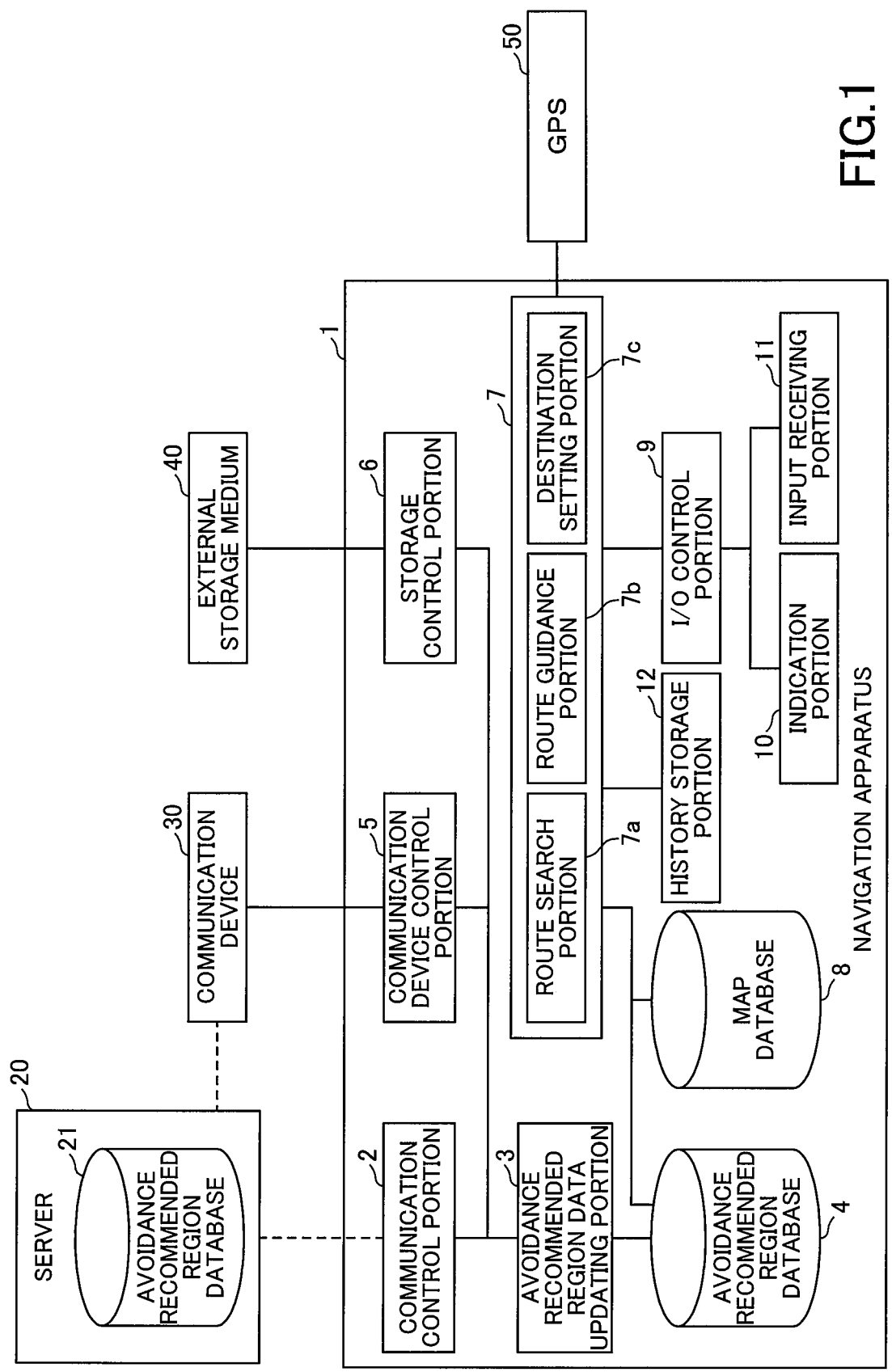
FIG. 1 is a schematic block diagram of a navigation apparatus according to a first example of the present invention.

The navigation apparatus according to an embodiment of the present invention is described below. The navigation apparatus according to an embodiment of the present invention searches a route to a destination with a searching device and acquires information about an avoidance recommended region, which is a region for which avoidance of passing is recommended, with an avoidance recommended region acquisition device. The navigation apparatus reports, by means of a reporting device, the presence of an avoidance recommended region on the route searched by the searching device on the basis of the avoidance recommended region acquired by the avoidance recommended region acquisition device. Thus, when there is an avoidance recommended region on the route, the user or the like is able to be aware of the presence of a high-accident area or a high-crime area on the route.

In addition, the reporting device may again give a report when the route on which there is an avoidance recommended region on the route is selected. Thus, the navigation apparatus can encourage a reconsideration with respect to the selection by the user or the like.

In addition, the reporting device may report detailed information about the avoidance recommended region present on the route. Thus, the relationship between the avoidance recommended region and the route or the specific detailed information can be reported, so that the user or the like is aware of the specific detailed information to determine whether to select the route.

In addition, the reporting device may give a report depending on the avoidance recommendation degree of the avoidance recommended region. Thus, the aspect of the report can be changed depending on the avoidance recommendation degree, and more specific detailed information can be reported depending on the content of the avoidance recommendation degree.

In addition, the navigation apparatus may further include a passage history acquisition device for acquiring history information, which is a history of passing the avoidance recommended region, and the reporting device may determine the presence or absence of a report on the basis of the history information. Thus, when there is a past passage history, a determination, e.g., of not making a report, can be made.

In addition, the reporting device may not report an avoidance recommended region the history information of which has a predetermined value or more. Thus, a home or an area the user or the like has visited many times or passed many times may not be reported even in the case of an avoidance recommended region.

In addition, the searching device, in the case of straying off of the route, may search a re-searched route, a route different from the route, and the reporting device may give a report on the basis of the avoidance recommended region on the re-searched route. Thus, when there is an avoidance recommended region on the route also in a rerouting operation in the case of straying off of the route during guiding, the user or the like is able to be aware of the presence of a high-accident area or a high-crime area on the route.

In addition, the information processing device according to an embodiment of the present invention searches a route with a searching device and acquires information about an avoidance recommended region, which is a region for which avoidance of passing is recommended, with an avoidance recommended region acquisition device. Furthermore, the information processing device, with the report information generation device, generates report information indicating the presence of an avoidance recommended region on the route searched by the searching device on the basis of the avoidance recommended region acquired by the avoidance recommended region acquisition device, and, with an output device, outputs the report information generated by the report information generation device to the outside. Thus, when there is an avoidance recommended region on the route, as report information is generated and output to a terminal or the like of the user or the like, the user or the like is able to be aware of the presence of a high-accident area or a high-crime area on the route.

In addition, the information report device according to an embodiment of the present invention receives, with the receiving device, the report information about the presence of the avoidance recommended region on a route on the basis of the avoidance recommended region, which is a region for which avoidance of passing is recommended on the searched route, and, with a presenting device, presents the report information received by the receiving device. Thus, the user or the like receives the report information and is able to be aware of the presence of the avoidance recommended region on the route.

In addition, the information reporting method according to an embodiment of the present invention, in the avoidance recommended region acquisition process, acquires information about the avoidance recommended region, which is a region for which avoidance of passing is recommended, and, in a report process, gives a report indicating the presence of the avoidance recommended region on the route searched in the search process on the basis of the avoidance recommended region acquired by the avoidance recommended region acquisition device. Thus, when there is an avoidance recommended region on the route, the user or the like is able to be aware of the presence of a high-accident area or a high-crime area on the route.

In addition, the aforementioned information reporting method may be carried out by a computer as an information report program. Thus, with the use of a computer, when there is an avoidance recommended region or the like on the route, the user or the like is able to be aware of the presence of a high-accident area or a high-crime area on the route.

In addition, the aforementioned information indication program may be stored in a computer-readable recording medium. Thus, in addition to the case where the program is incorporated into a device, the program may be distributed alone, enabling upgrading with ease.

Example 1

A navigation apparatus according to a first example of the present invention is described with reference to FIGS. 1 to 8. Examples of the navigation apparatus include those for a motorcycle, a bicycle, and a pedestrian in addition to an automotive navigation apparatus, as well as those configured to be an app for a smartphone or the like. In addition, a route searched by the navigation apparatus 1 is not limited to a road, but includes a route using public transportation or the like, e.g., a railway.

As illustrated in FIG. 1, the navigation apparatus 1 includes a communication control portion 2, an avoidance recommended region data updating portion 3, an avoidance recommended region database 4, a communication device control portion 5, a storage control portion 6, a route control portion 7, a map database 8, an I/O control portion 9, an indication portion 10, an input receiving portion 11, and a history storage portion 12.

The communication control portion 2, which is an avoidance recommended region acquisition device, communicates with a server 20, which is connected via Internet or the like, and acquires the avoidance recommended region information, which is information indicating the avoidance recommended region, which is a region for which avoidance of passing is recommended, from the server 20, and outputs the avoidance recommended region information to the avoidance recommended region data updating portion 3. The communication control portion 2 may be configured to acquire the avoidance recommended region information of only a region required for route searching because of control by the route control portion 7 or may be configured to acquire updated avoidance recommended region information.

The avoidance recommended region data updating portion 3 updates the avoidance recommended region database 4 on the basis of the avoidance recommended region information the communication control portion 2 received from the server 20. The avoidance recommended region information is information including information of a location (range, area) of the avoidance recommended region, which is a region which is recommended to be avoided as a traveling route, and the specific content (frequent occurrence of crimes, frequent occurrence of accidents; this may be further subdivided) of the area.

The avoidance recommended region database 4 is a database that stores information indicating the avoidance recommended region including a high-crime area and a high-accident area. The avoidance recommended region database 4 is included in the avoidance recommended region information and is stored while the information about the location of the avoidance recommended region is associated with the specific avoidance recommendation content of the area.

With the configuration of FIG. 1, the avoidance recommended region information acquired by the communication control portion 2 is accumulated in the avoidance recommended region database 4 by the avoidance recommended region data updating portion 3. However, the avoidance recommended region information acquired by the communication control portion 2 from the server 20 may be configured to be directly used when the route control portion 7 (route search portion 7a) searches a route.

The communication device control portion 5 is an interface to the communication device 30 connected to the navigation apparatus 1 and may be connected to the communication device 30 by wire or wirelessly. The communication device control portion 5 may be eliminated when the communication control portion 2 is provided.

The storage control portion 6 is an interface to an external storage medium 40 connected to the navigation apparatus 1. The storage control portion 6, when the avoidance recommended region information is stored in the external storage medium 40, reads out the avoidance recommended region information and outputs it to the avoidance recommended region data updating portion 3.

The route control portion 7 includes the route search portion 7a, a route guidance portion 7b, and a destination setting portion 7c. The route search portion 7a, which is a searching device, searches a route from a current position to the destination set by the destination setting portion 7c on the basis of map data stored in the map database 8 and the avoidance recommended region information stored in the avoidance recommended region database 4.

The route guidance portion 7b generates and outputs information (guidance information) for guiding the user or the like along the route searched by the route search portion 7a from the current position. The guidance information includes a line, an arrow, and the like indicating a route indicated on the indication portion 10, and audio guide output from a speaker or the like, which is not illustrated. In addition, the current position is indicated on the map on the basis of the latitude and longitude information of the current position received from a GPS receiver 50.

The destination setting portion 7c sets the destination input by the user or the like from the input receiving portion 11.

The map database 8 stores map data used by the route search portion 7a or the like.

The I/O control portion 9 controls the output of data indicated on the indication portion 10 and the input of information (destination or the like) input from the input receiving portion 11.

The indication portion 10 includes, for example, a liquid crystal display and an EL display, and indicates the guidance information generated by the route control portion 7, the map data stored in the map database 8, and buttons, a menu, or the like for operation.

The input receiving portion 11 includes, for example, a touch panel superimposed on the indication portion 10 and a push button, and receives an operation of input of a destination or the like from the user or the like.

The history storage portion 12 is a non-volatile memory device that stores the history of the routes the user or the like traveled previously, the history of destination setting, or the like. The setting information of a home or the like may be stored in the history storage portion 12.

The server 20 is a server device connected to a network, e.g., Internet, and is capable of communication with the navigation apparatus 1 directly via Internet or the like or with the navigation apparatus 1 via the communication device 30. The server 20 has the avoidance recommended region database 21. Similar to the avoidance recommended region database 4 of the navigation apparatus 1, the avoidance recommended region database 21 is stored while the information of the location (range, area) of the avoidance recommended region is associated with the specific content (frequent occurrence of crimes, frequent occurrence of accidents; this may be further subdivided) of the avoidance recommendation of the area. The avoidance recommended region database 21 of the server 20 stores the avoidance recommended region which is broader than that of the avoidance recommended region database 4 of the navigation apparatus 1, and is updated frequently.

The content of the avoidance recommended region database 21 is not limited to searching by a business operator or the like who carries out the present example, but may be acquired from services, e.g., safety information published on Internet or the like by an external public agency, a business operator, or the like. Such services include Overseas Safety HP published by the Ministry of Foreign Affairs of Japan.

The communication device 30 is a device having a relay function (router function) for smartphones, cellular phones, or the like or a device, e.g., a mobile router, and relays communication between the navigation apparatus 1 and the server 20.

The external storage medium 40 includes a detachable memory medium, e.g., a USB memory or an SD card. The external storage medium 40 stores, for example, the avoidance recommended region information downloaded from a different computer or the like.

As is well known, the GPS receiver 50 receives radio waves transmitted from GPS (Global Positioning System) satellites, determines the current position information (latitude, longitude), and outputs it to the route control portion 7. The GPS receiver 50 may be incorporated into the navigation apparatus 1.

Figure 2:
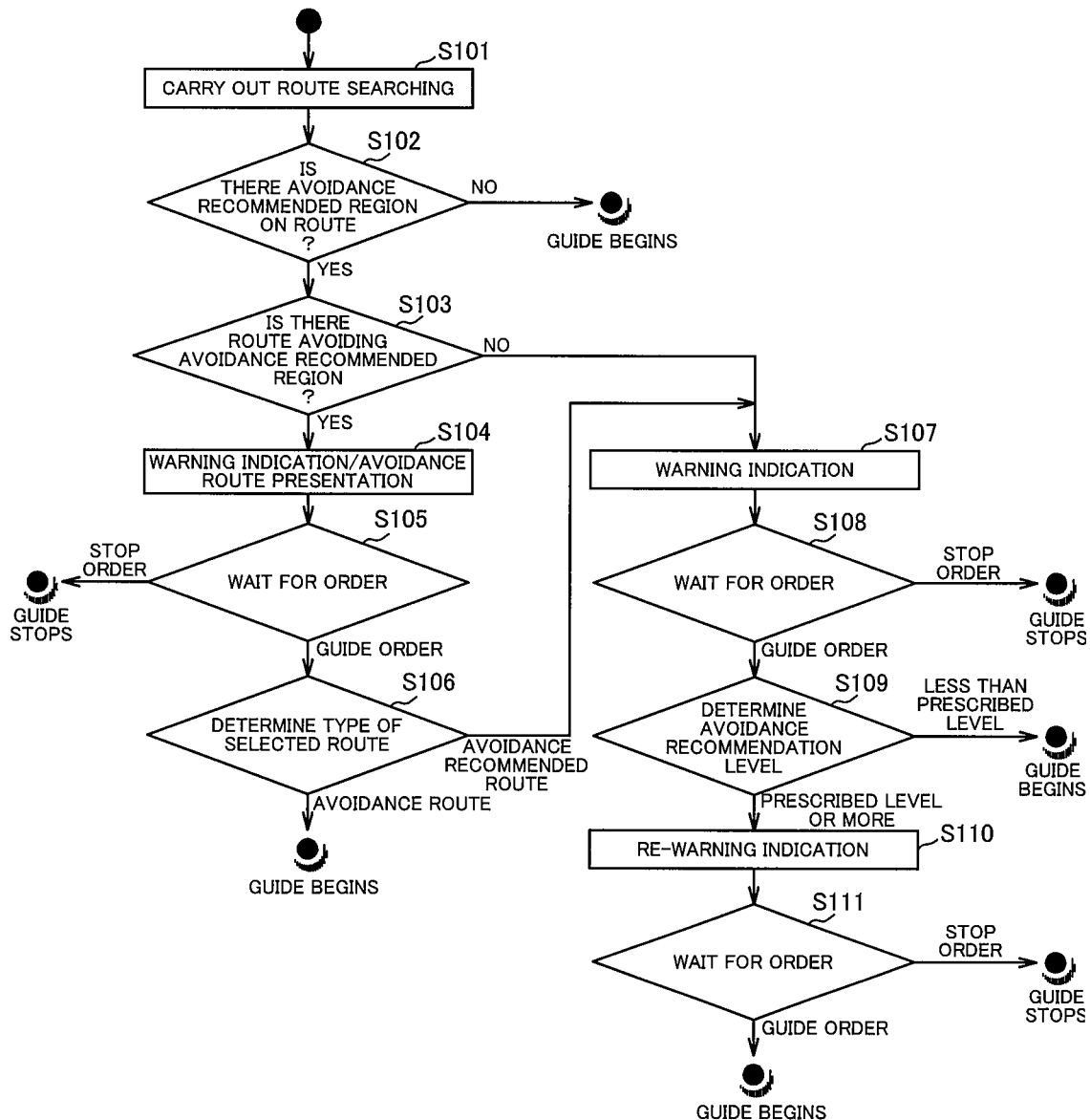
FIG. 2 is a flowchart of a route search operation of the navigation apparatus illustrated in FIG. 1

Next, the route search operation of the navigation apparatus 1 configured in the aforementioned manner is described with reference to the flowchart illustrated in FIG. 2. The flowchart illustrated in FIG. 2 is carried out by the route control portion 7.

First, in step S101, the route search portion 7a searches a route to a destination input from the input receiving portion 11 and set by the destination setting portion 7c. For algorithm of route retrieving, a well-known algorithm, e.g., a Dijkstra's algorithm, may be used.

Next, in step S102, the route search portion 7a determines whether there is an avoidance recommended region on the route searched in step S101, and, if it exists, the step moves to step S103, and, if it does not exist, the guide begins. It is sufficient that the presence or absence of the avoidance recommended region is determined on the basis of the avoidance recommended region information stored in the avoidance recommended region database 4.

Next, in step S103, the route search portion 7a searches a route avoiding the avoidance recommended region other than the route searched in step S101, determines whether there is an avoidance route, and, if it exists, the step moves to step S104, and, if it does not exist, the step moves to step S107.

Figure 3:
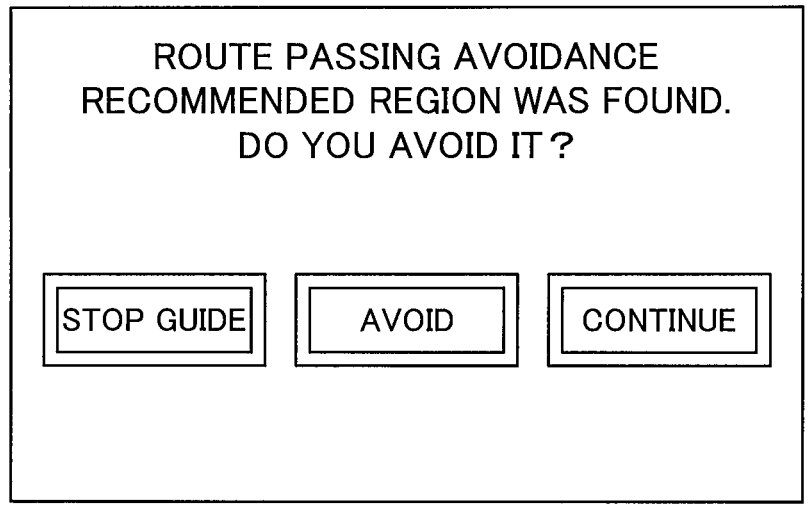
FIG. 3 is an example of warning indication/avoidance route indication of the flowchart illustrated in FIG. 2.

Next, in step S104, because it has been determined in step S103 that the route avoiding the avoidance recommended region is present, the route search portion 7a makes the indication portion 10 perform warning indication/avoidance route indication, and the step moves to step S105. The warning indication/avoidance route indication indicates, on the indication portion 10, the fact that the avoidance recommended region is included on the searched route and there is a route avoiding the avoidance recommended region. An example of the warning indication/avoidance route indication is illustrated in FIG. 3. Specifically, the warning indication/avoidance route indication indicates (reporting) the presence of the avoidance recommended region on the route on the basis of the avoidance recommended region acquired by the communication control portion 2 (avoidance recommended region acquisition device) on the route searched by the route search portion 7a (searching device).

Next, in step S105, the route search portion 7a waits for an input order from the user or the like, and, when the user orders stop of searching (guiding), stops the guiding, and, when the user orders guiding, the step moves to step S106. In the case of FIG. 3, for example, the operation of "stop guide" is regarded to be an order of stop of searching, and the operation of "avoid" or "continue" is regarded to be an order of guiding.

Next, in step S106, the route search portion 7a determines the type (avoid or continue) of the route selected in step S105. When the avoidance route is selected (in the case of "avoid" operation in FIG. 3), the route guidance portion 7b begins guiding on the avoidance route. When the avoidance recommended route (a route including the avoidance recommended region) is selected (in the case of "continue" operation in FIG. 3), the step moves to S107.

Figure 4:
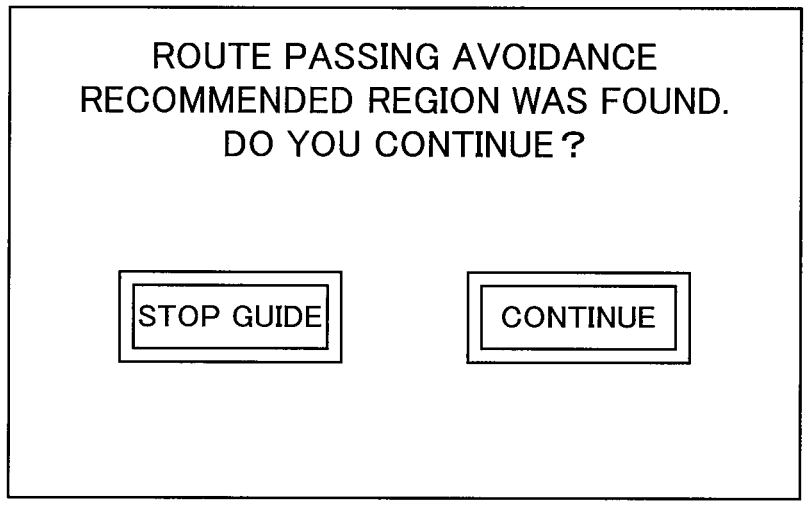
FIG. 4 is an example of warning indication of the flowchart illustrated in FIG. 2.

Next, in step S107, the route search portion 7a makes the indication portion 10 perform warning indication indicating that the route passes the avoidance recommended region, and the step moves to step S108. FIG. 4 illustrates an example of the warning indication. Specifically, the present step also performs warning indication (reporting) indicating the presence of the avoidance recommended region on the route searched by the route search portion 7a (searching device) on the basis of the avoidance recommended region acquired by the communication control portion 2 (avoidance recommended region acquisition device). In addition, when the step moves from step S106, the present step performs re-warning indication (re-reporting) when the route on which the avoidance recommended region is present on the route is selected.

Next, in step S108, the route search portion 7a waits for an input order from the user or the like, and, when the user orders stop of searching (guiding), stops the guiding, and, when the user orders guiding, the step moves to step S109. In the case of FIG. 4, for example, the operation of "stop guide" is regarded to be an order of stop of searching, and the operation of "continue" is regarded to be an order of guiding.

Next, in step S109, when the avoidance recommendation level determined by the route search portion 7a is less than a prescribed level, the route guidance portion 7b begins guiding on the currently searched route, and when the avoidance recommendation level is equal to or more than the prescribed level, the step moves to step S110. The avoidance recommendation level is a level defined as a function of the reason (content) as to why avoidance of the avoidance recommended region should be recommended, and is configured as indicated, for example, in a table illustrated in FIG. 5. In addition, the prescribed level is a threshold setting the avoidance recommendation level requiring re-warning to be described below, and an initial value is preset, but may be changed later.

Figures 5, 6:
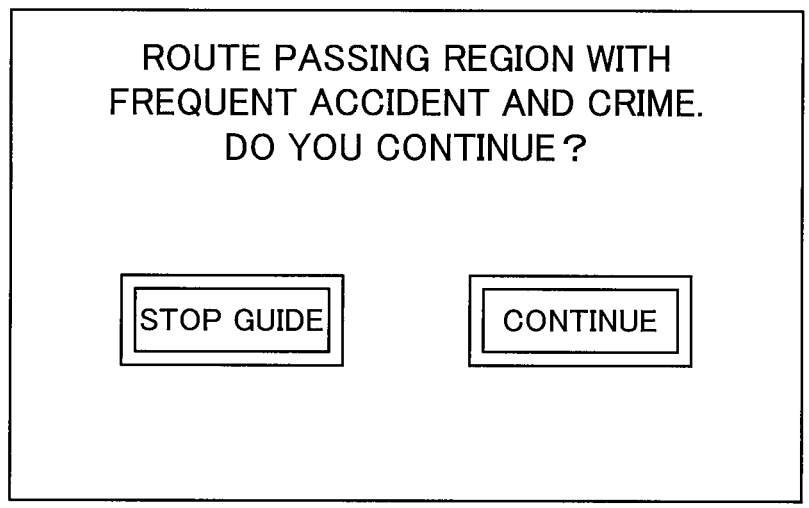
FIG. 5 is an example of classification of avoidance recommendation level.
FIG. 6 is an example of re-warning indication of the flowchart illustrated in FIG. 2.

Next, in step S110, the route search portion 7a makes the indication portion 10 perform re-warning indication, and the step moves to step S111. FIG. 6 illustrates an example of the re-warning indication. In FIG. 6, the indication takes into consideration the determination of the avoidance recommendation level in step S109 and is a specific indication content with respect to FIG. 4. Specifically, re-warning indication (re-reporting) is performed when the route on which the avoidance recommended region is present on the route is selected.

In addition, regarding the indication of FIG. 6, the background color, the text color, the font and the like may be changed depending on the avoidance recommendation level. In addition, when the avoidance recommendation level is high, the indication may be output together with a warning tone, and the content, the sound volume, and the like of the warning tone may be changed depending on the avoidance recommendation level. Specifically, a warning indication (reporting) depending on the avoidance recommendation degree is carried out.

Next, in step S111, the route search portion 7a waits for an input order from the user or the like, and, when the user orders stop of searching (guiding), stops the guiding, and, when the user orders guiding, the route guidance portion 7b begins guiding on the currently searched route. In the case of FIG. 6, for example, the operation of "stop guide" is regarded to be an order of stop of searching, and the operation of "continue" is regarded to be an order of guiding.

As is apparent from the aforementioned description, step S101 functions as the search process, step S102 functions as the avoidance recommended region acquisition process, and steps S104, S107 and S110 function as the report process. In addition, when the flowchart (information reporting method) illustrated in FIG. 2 is configured to be a computer program operated by a computer, the computer can function as an information report program.

Figure 7:
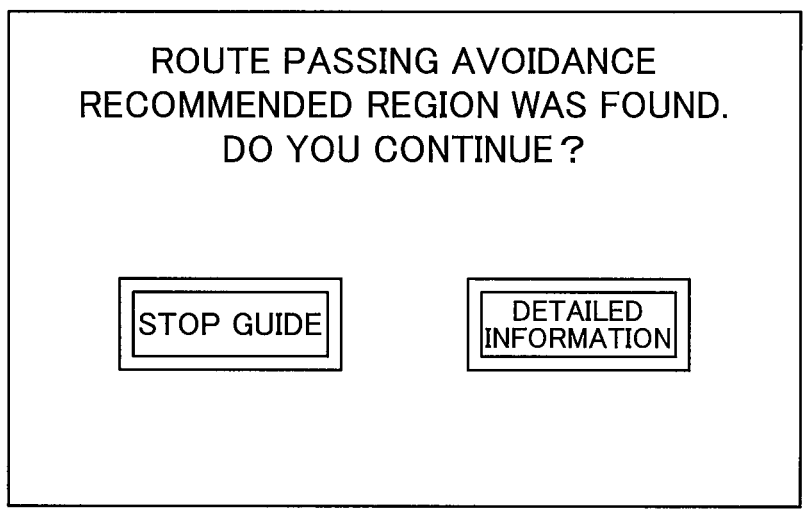
FIG. 7 is a variation of warning indication or re-warning indication illustrated in FIG. 4 or 6.
Figure 8:
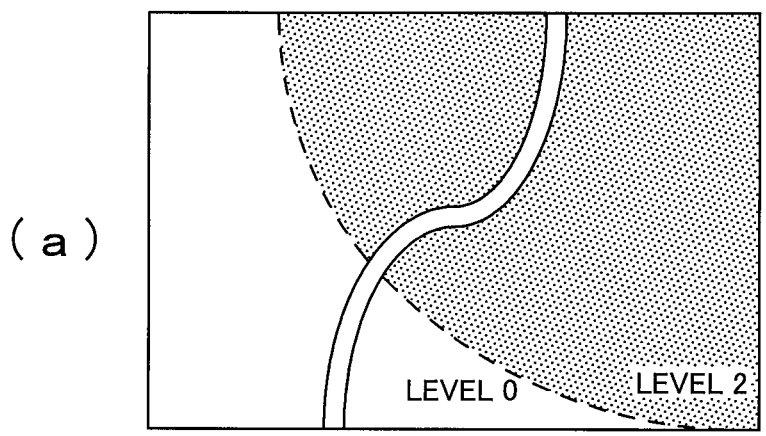
FIG. 8 is an example of indication of detailed information illustrated in FIG. 7.
Figure 8:
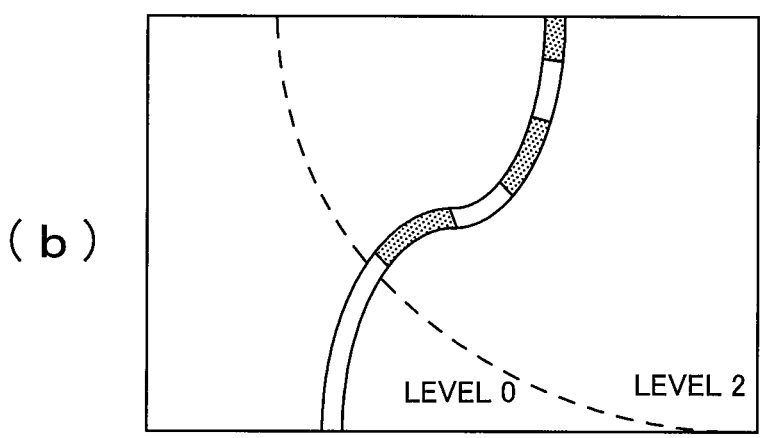

The warning indication of FIG. 4 or 6 may be configured to indicate (report) detailed information. Examples of indication of detailed information are illustrated in FIGS. 7 and 8. FIG. 7 is a variation of FIG. 4. When detailed information is operated on the indication of FIG. 7, an indication such as that of FIG. 8 is indicated. FIG. 8 is a map indicating a searched route and regions for corresponding levels of avoidance recommended regions. FIG. 8(a) is an example of an highlighted indication of a region of a high avoidance recommendation level with hatching, and FIG. 8(b) is an example of an highlighted indication of only a part of a high avoidance recommendation level on the route with hatching. Of course, the color may be changed without hatching. In addition, the avoidance recommendation level may be indicated together with a specific avoidance recommendation content (e.g., a high-accident area).

According to the present example, with the navigation apparatus 1, the route search portion 7a searches a route to a destination, and the communication control portion 2 acquires the avoidance recommended region information from the avoidance recommended region database 4 that stores the avoidance recommended region information acquired from the server 20. Furthermore, on the basis of the avoidance recommended region, the indication portion 10 indicates the presence of the avoidance recommended region on the route searched by the route search portion 7a. Thus, the user or the like is able to be aware of the avoidance recommended region on the route, if it exists.

In addition, the indication portion 10 may again indicate a warning when the route on which there is an avoidance recommended region on the route is selected. Thus, the navigation apparatus can encourage a reconsideration with respect to the selection by the user or the like.

In addition, the indication portion 10 may indicate detailed information of the avoidance recommended region present on the route. Thus, it is possible to specifically indicate, on a map or the like, where in the avoidance recommended region to pass and to indicate a specific avoidance recommendation content. Thus, the user or the like is able to be aware of the content of specific avoidance recommendation property or the like so as to determine whether to select the route.

In addition, the indication portion 10 may perform indication depending on the avoidance recommendation level of the avoidance recommended region. Thus, the aspect of the report can be changed depending on the avoidance recommendation level and more specific reason of recommending avoidance can be reported depending on the content of the avoidance recommendation level.

Example 2

A navigation apparatus according to a second example of the present invention is described with reference to FIG. 9. The same parts as those of the first example described above are assigned the same reference numerals and will not be elaborated.

The present example is an example in which, even when a destination is included in the avoidance recommended region, a warning is not indicated when a specific condition is satisfied on the basis of home information, previous traveling history information, or the like stored in the history storage portion 12. The route search operation according to the present example is described with reference to the flowchart illustrated in FIG. 9.

Figure 9:
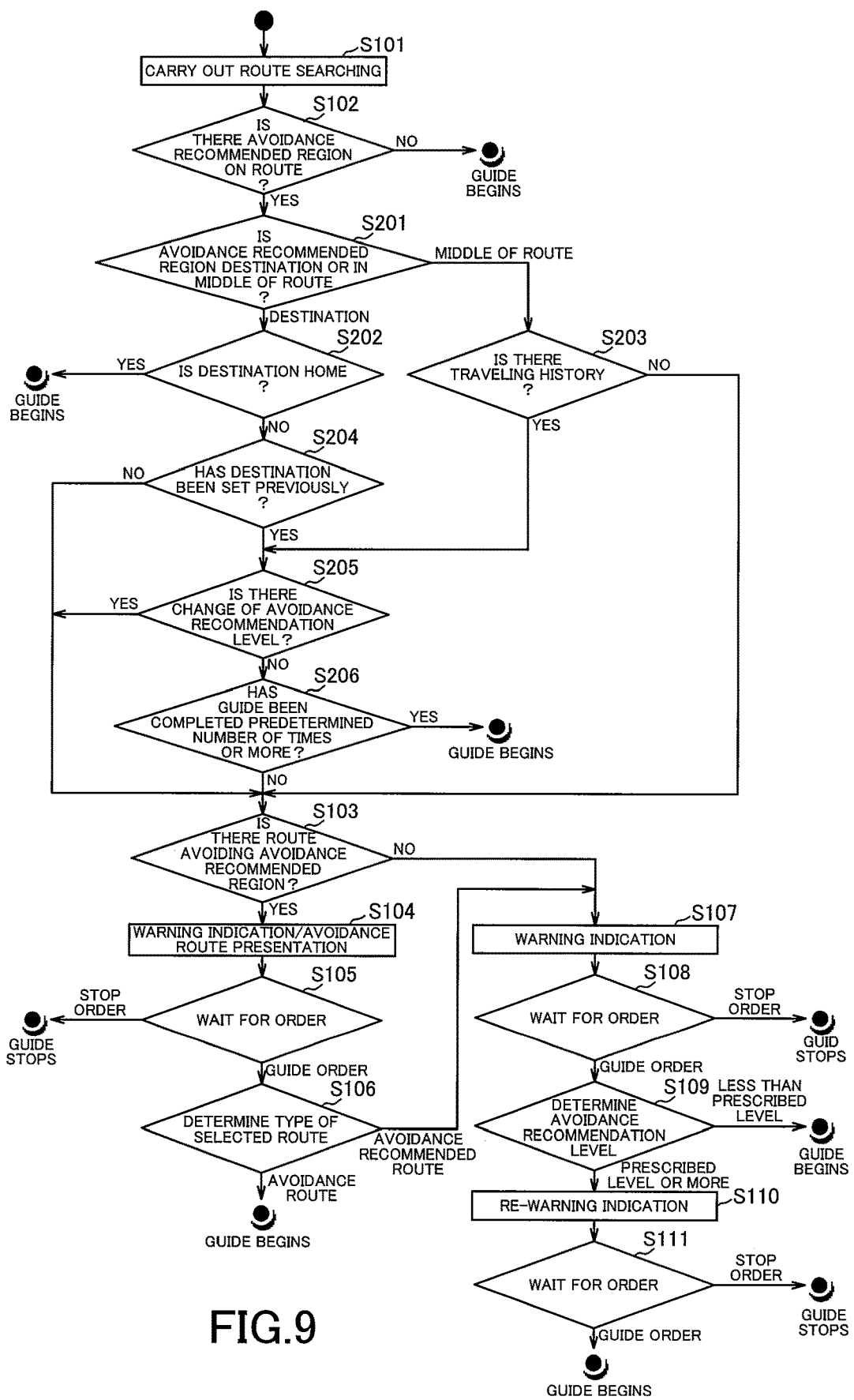
FIG. 9 is a flowchart of a route search operation of a navigation apparatus according to a second example of the present invention.

FIG. 9 differs from the flowchart of FIG. 2 in that the operations of steps S201 to S206 are inserted between step S102 and step S103.

Next, in step S201, the route search portion 7a determines whether the avoidance recommended region is present at the destination or in the middle of the route. In the case where the avoidance recommended region is present at the destination, the step moves to S202, and in the case where the avoidance recommended region is present in the middle of the route, the step moves to step S203. When the avoidance recommended region includes both the destination and the route in the present step, it is sufficient to determine that the avoidance recommended region includes the destination.

Next, in step S202, the route search portion 7a determines whether the set destination is a home. In the case of a home, the guiding on the currently searched route begins, and if this is not the case, the step moves to step S203. That is to say, when the home is the destination, guiding is carried out even in the avoidance recommended region.

In step S203, the route search portion 7a determines whether there is a history of previous traveling on the route included in the avoidance recommended region on the basis of the traveling history information stored in the history storage portion 12. When there is a history, the step moves to step S205, and when there is no history, the step moves to step S103. That is to say, even if the avoidance recommended region is included in the middle of the route, guiding is performed on the route on which the user has traveled previously when the conditions after step S205 are satisfied.

In step S204, the route search portion 7a determines whether a set destination has previously been set before on the basis of the traveling history information stored in the history storage portion 12. When it has previously been set before, the step moves to step S205, and when it has not previously been set before, the step moves to step S103.

Next, in step S205, the route search portion 7a determines whether the avoidance recommendation level has been changed from the time when the destination was set previously or from the time when the route was searched. When there is no change, the step moves to S205, and when there is a change, the step moves to S103. In the present example, the position (range) of the avoidance recommended region on the previously traveling route and the avoidance recommendation level thereof are collectively recorded as traveling history information to enable determination of the present step. Regarding the determination of the present step, it may be determined that there is a change only when the avoidance recommendation level becomes higher. However, even when the avoidance recommendation level becomes lower, in the case of the levels other than zero, it is preferable to notify the user or the like of a warning indication.

Next, in step S206, the route search portion 7a determines whether the guiding has been completed a predetermined number of times or more on the basis of the traveling history information stored in the history storage portion 12. When it has been completed, the guiding on the currently searched route begins, and when it has not been completed, the step moves to step S103. That is to say, when the guiding has been completed a predetermined number of times or more (preferably, multiple times) without a change of the avoidance recommendation level, it is determined that safe traveling has been made, and a warning is not indicated. Specifically, the avoidance recommended region in which the guiding has been completed a predetermined number of times or more (the history information has a predetermined value or more) is not reported.

Specifically, in the present example, the presence of the avoidance recommended region is reported on the basis of the history information so that a warning is not indicated when the destination is a home or when safe traveling has been made.

According to the present example, the route control portion 7 acquires the traveling history information from the history storage portion 12 that stores the previous traveling history information including the history of passing the avoidance recommended region, and determines whether to indicate a warning on the indication portion on the basis of the traveling history information. Thus, when there is a previous passage history, a determination, e.g., not indicating a warning, can be made.

In addition, when the destination is a home, a warning is not indicated even when the home is included in the avoidance recommended region. Thus, it is possible not to indicate a warning with regard to the home.

In addition, a warning is not indicated when the avoidance recommendation level is not changed from the time of previous traveling and the guiding has been completed a predetermined number of times or more. Thus, it is determined that there is small necessity of recommending practical avoidance of the route or destination for which the guiding has been completed many times, so that a warning is not indicated.

In the present example, it may be determined whether to indicate an alarm in consideration of the traveling time of the traveling history information stored in the history storage portion 12. When, for example, previous traveling is made in the daytime, the traveling history can be regarded to be absent in the case of route searching for traveling in the nighttime.

Example 3

Figure 10:
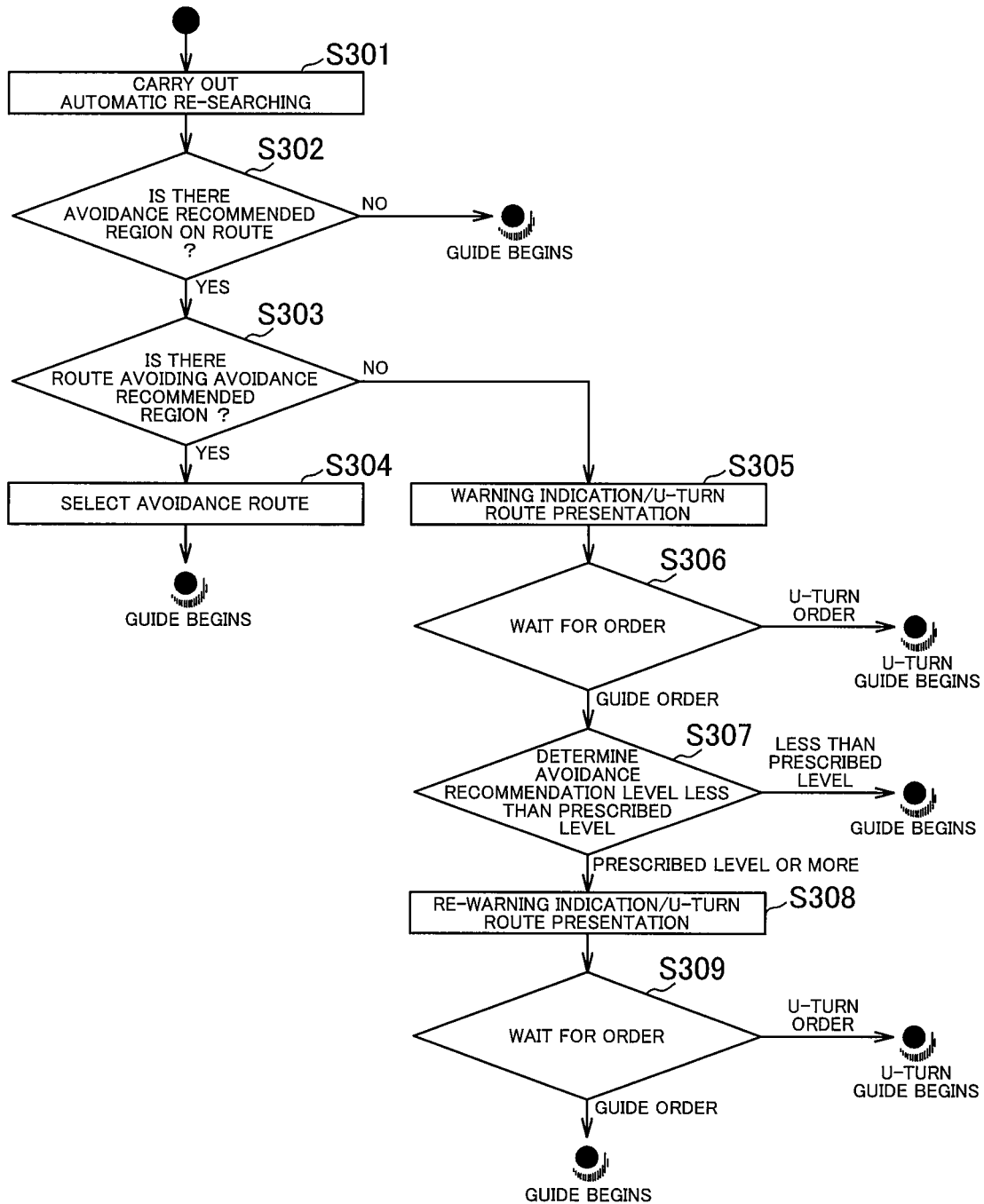
FIG. 10 is a flowchart of a route search operation of a navigation apparatus according to a third example of the present invention.
Figure 11:
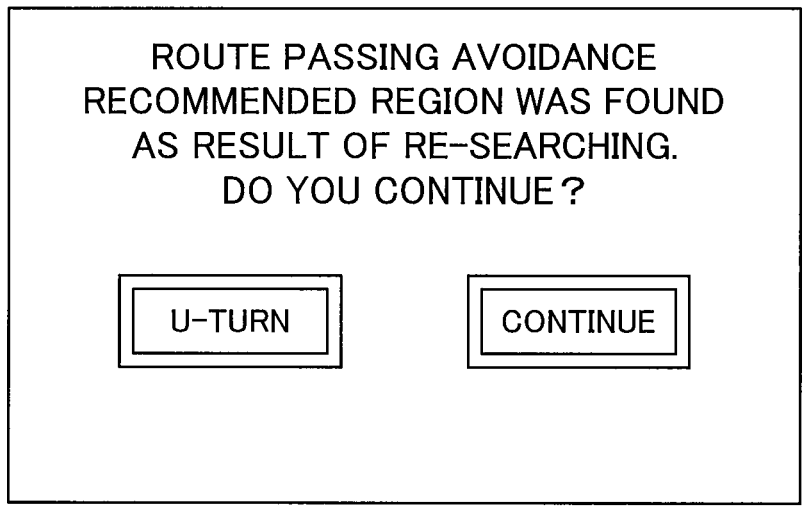
FIG. 11 is an example of warning indication/U-turn route indication of the flowchart illustrated in FIG. 10.
Figure 12:
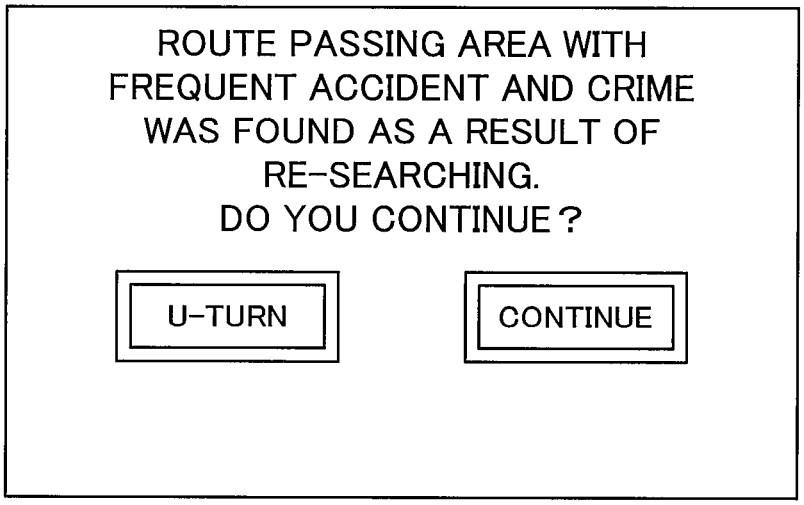
FIG. 12 is an example of re-warning indication/U-turn route indication of the flowchart illustrated in FIG. 10.

A navigation apparatus according to a third example of the present invention is described with reference to FIGS. 10 to 12. The same parts as those of the first and second examples described above are assigned the same reference numerals and will not be elaborated.

The present example is an example for re-searching (re-routing) in the case of straying off of the route after the beginning of the guiding. The route re-searching operation according to the present example is described with reference to the flowchart illustrated in FIG. 10.

First, in step S301, when the route guidance portion 7b compares the current position and the guide route and determines the presence of straying off of the route, the route search portion 7a carries out route re-searching to the destination (searches a re-searched route).

Next, in step S302, the route search portion 7a determines whether there is an avoidance recommended region on the route searched in step S301, and, if it exists, the step moves to step S303, and, if it does not exist, the guiding begins. It is sufficient that the presence or absence of the avoidance recommended region is determined on the basis of the avoidance recommended region information stored in the avoidance recommended region database 4.

Next, in step S303, the route search portion 7a searches a route avoiding the avoidance recommended region other than the route searched in step S101, and determines whether there is an avoidance route, and, if it exists, the step moves to step S304, and, if it does not exist, the step moves to step S305.

Next, in step S304, the route guidance portion 7b begins guiding on the avoidance route because the avoidance route has been selected.

Next, in step S305, because it has been determined in step S303 that the route avoiding the avoidance recommended region is not present, the route search portion 7a makes the indication portion 10 perform warning indication/U-turn route presentation, and the step moves to step S306. The warning indication/U-turn route presentation indicates on the indication portion 10 that the avoidance recommended region is included on the re-searched route, an avoidance route is absent, and making a U-turn is recommended. An example of the warning indication/U-turn route presentation is illustrated in FIG. 11. Specifically, a warning indication (reporting) is carried out on the basis of the avoidance recommended region on the re-searched route.

Next, in step S306, the route search portion 7a waits for an input order from the user or the like and, when the user orders making a U-turn, searches a U-turn route to the destination setting point, and begins guiding on the route, and when the user orders guiding on a route passing the avoidance recommended region, the step moves to step S307. In the case of FIG. 10, for example, the operation of "U-turn" is regarded to be an order of making a U-turn, and the operation of "continue" is regarded to be an order of guiding on the route passing the avoidance recommended region.

Next, in step S307, when the avoidance recommendation level determined by the route search portion 7a is less than a prescribed level, the guiding begins on the currently searched route, and when the avoidance recommendation level is equal to or more than the prescribed level, the step moves to step S308. The avoidance recommendation level and the prescribed level are the same as those in step S109 of FIG. 2.

Next, in step S308, the route search portion 7a makes the indication portion 10 perform re-warning indication/U-turn route presentation, and the step moves to step S309. The re-warning indication/U-turn route presentation provides an indication in consideration of the avoidance recommendation level determined in step S307 and encourages the user or the like to make a U-turn. An example of the re-warning indication/U-turn route presentation is illustrated in FIG. 12. In addition, similarly, regarding the indication of FIG. 12, the background color, the text color, the font and the like may be changed depending on the avoidance recommendation level. In addition, when the avoidance recommendation level is high, the indication may be output together with a warning tone, and the content, the sound volume, and the like of the warning tone may be changed depending on the avoidance recommendation level.

Next, in step S309, the route search portion 7a waits for an input order from the user or the like and, when the user orders making a U-turn, searches a U-turn route to the destination setting point, and begins guiding on the route, and when the user orders guiding on a route passing the avoidance recommended region, the guiding on the route begins. In the case of FIG. 12, for example, the operation of "U-turn" is regarded to be an order of making a U-turn, and the operation of "continue" is regarded to be an order of guiding on the route passing the avoidance recommended region.

According to the present example, in the case of straying off of the route, the route search portion 7a searches a re-searched route, a route different from the route, and provides an indication on the indication portion 10 when there is an avoidance recommended region on the re-searched route. Thus, the user or the like is able to be aware of the presence of the avoidance recommended region on the route, if it exists, also in a re-routing operation in the case of straying off of the route during guiding.

Example 4

Figure 13:
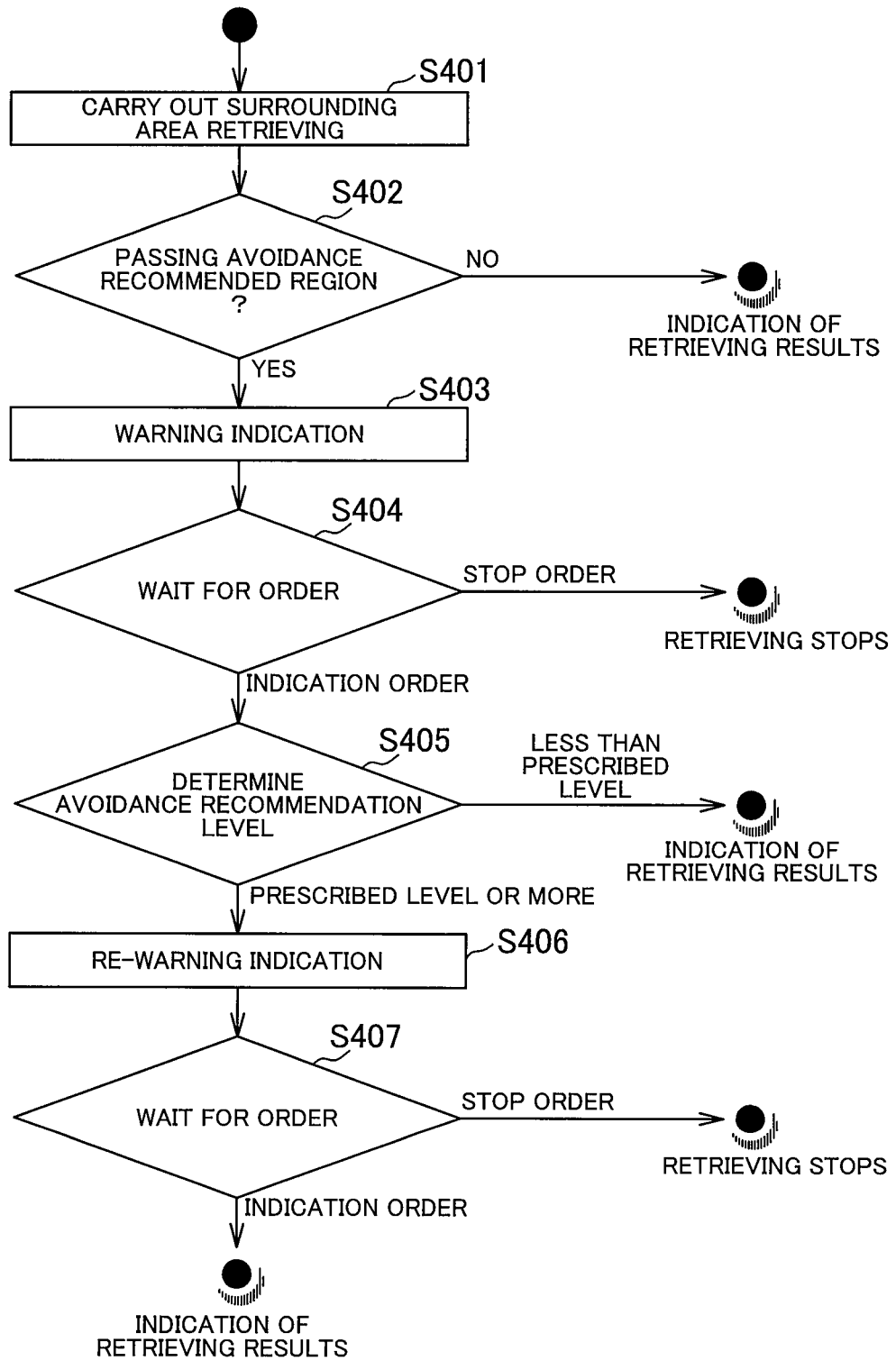
FIG. 13 is a flowchart of a surrounding area searching operation of a navigation apparatus according to a fourth example of the present invention.

A navigation apparatus according to a fourth example of the present invention is described with reference to FIG. 13. The same parts as those of the first to third examples described above are assigned the same reference numerals and will not be elaborated.

The present example is an example not for the time of route searching, but for the time when the user or the like performs surrounding area retrieving after the beginning of guiding. The surrounding area retrieving operation according to the present example is described with reference to the flowchart illustrated in FIG. 13.

First, in step S401, surrounding area retrieving is performed. The surrounding area retrieving is retrieving of facilities or the like present around the route, and specifies the name of a facility, a genre, or the like through the input receiving portion 11, and the route guidance portion 7b performs retrieving on the map database 8.

Next, in step S402, the route guidance portion 7b determines whether the user or the like is currently passing the avoidance recommended region. When the user or the like is passing, the step moves to step S403, and when the user or the like is not passing, the result retrieved in step S401 is indicated on the indication portion 10. It is sufficient that whether the user or the like is passing the avoidance recommended region is determined on the basis of the avoidance recommended region information stored in the avoidance recommended region database 4.

Figure 14:
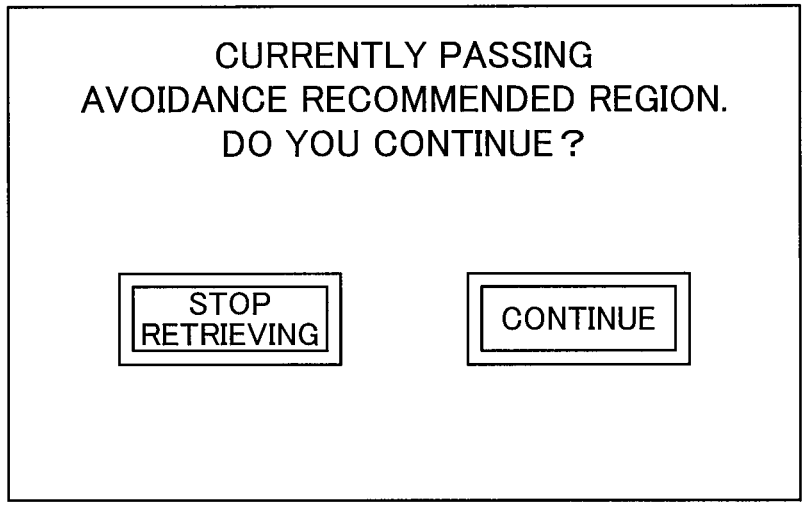
FIG. 14 is an example of warning indication of the flowchart illustrated in FIG. 13.

Next, in step S403, the route guidance portion 7b determines that the user or the like is passing the avoidance recommended region and makes the indication portion 10 perform a warning indication, and the step moves to step S404. FIG. 14 illustrates an example of the warning indication. Specifically, when the surrounding area retrieving is performed while the user or the like is passing the avoidance recommended region, the warning indication (reporting) is performed.

Next, in step S404, the route guidance portion 7b waits for an input order from the user or the like, and, when the user orders stop of retrieving, reverses the result of retrieving of step S401 to stop the surrounding area retrieving, and when the user orders indication of the result of the surrounding area retrieving, the step moves to step S405. In the case of FIG. 14, for example, the operation of "stop retrieving" is regarded to be an order of stop of retrieving, and the operation of "continue" is regarded to be an order of indicating the result of the surrounding area retrieving.

Next, in step S405, when the route guidance portion 7b determines the avoidance recommendation level to be less than a prescribed level, the result of the surrounding area retrieving is indicated, and when the avoidance recommendation level is equal to or more than the prescribed level, the step moves to step S406. The avoidance recommendation level and the prescribed level are the same as those in step S109 of FIG. 2.

Figure 15:
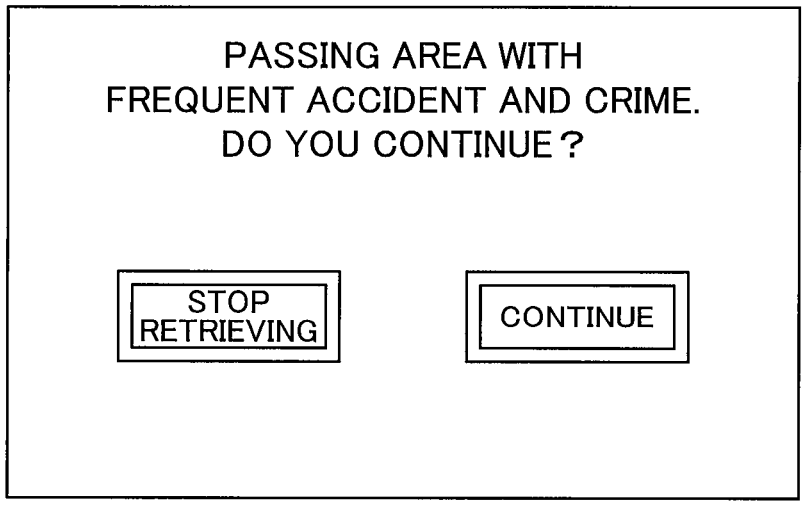
FIG. 15 is an example of re-warning indication of the flowchart illustrated in FIG. 13.

Next, in step S406, the route guidance portion 7b makes the indication portion 10 perform re-warning indication, and the step moves to step S407. The re-warning indication provides an indication in consideration of the avoidance recommendation level determined in step S405. FIG. 15 illustrates an example of the re-warning indication. In addition, similarly, regarding the indication of FIG. 15, the background color, the text color, the font and the like may be changed depending on the avoidance recommendation level. In addition, when the avoidance recommendation level is high, the indication may be output together with a warning tone, and the content, the sound volume, and the like of the warning tone may be changed depending on the avoidance recommendation level.

Next, in step S407, the route guidance portion 7b waits for an input order from the user or the like, and, when the user orders stop of retrieving, reverses the result of retrieving of step S401 to stop the surrounding area retrieving, and when the user orders indication of the result of the surrounding area retrieving, the indication portion 10 indicates the result of retrieving of step S401. In the case of FIG. 15, for example, the operation of "stop retrieving" is regarded to be an order of stop of retrieving, and the operation of "continue" is regarded to be an order of indicating the result of the surrounding area retrieving.

According to the present example, the route guidance portion 7b indicates that the user or the like is currently passing the avoidance recommended region in passing the avoidance recommended region at the time of retrieving of surrounding facilities during guiding on the searched route. Thus, it is possible to indicate a warning that recommended avoidance is to stay long because the user is passing the avoidance recommended region.

Example 5

Figure 16:
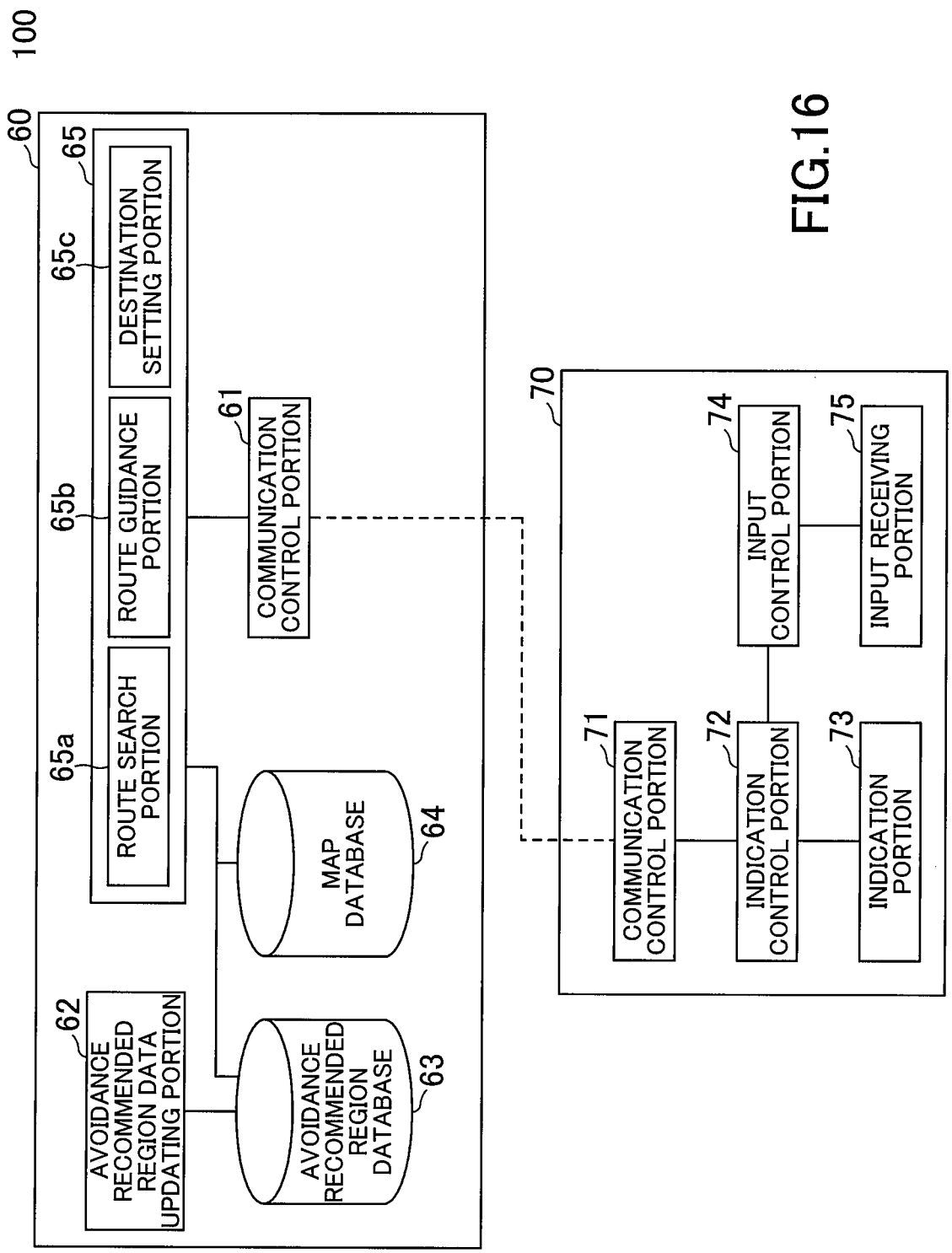
FIG. 16 is a schematic block diagram of a navigation system according to a fifth example of the present invention.

A navigation apparatus according to a fifth example of the present invention is described with reference to FIG. 16. The same parts as those of the first to fourth examples described above are assigned the same reference numerals and will not be elaborated.

In the first to fourth examples, the navigation apparatus 1 searches a route and indicates a warning on the basis of the presence or absence of the avoidance recommended region on the searched route or whether the user is currently passing the avoidance recommended zone. However, in the present example, a route is searched and warning information for indication is generated on the server, and the generated warning information is indicated on a smartphone or other portable terminals. The configuration of a navigation system 100 according to the present example is illustrated in FIG. 16.

The navigation system 100 includes a server 60, which is an information processing device, and a portable terminal 70, which is an information report device.

The server 60 includes a communication control portion 61, an avoidance recommended region data updating portion 62, an avoidance recommended region database 63, a map database 64, and a route control portion 65.

The communication control portion 61 communicates with a portable terminal 70 via Internet or the like and outputs guidance information or warning information regarding the route searched by the route control portion 65 to the portable terminal 70. In addition, the communication control portion 61 outputs avoidance recommended region information received by communicating with an external avoidance recommended region database or the like, e.g., the server 20 illustrated in FIG. 1, to the avoidance recommended region data updating portion 62.

The avoidance recommended region data updating portion 62 performs the same operation as the avoidance recommended region data updating portion 3 of FIG. 1. The avoidance recommended region database 63 performs the same operation as the avoidance recommended region database 4 of FIG. 1. The map database 64 performs the same operation as the map database 8 of FIG. 1. The route control portion 65 performs the same operation as the route control portion 65 of FIG. 1.

The portable terminal 70 is a potable terminal device, e.g., a smartphone, and includes a communication control portion 71, an indication control portion 72, an indication portion 73, an input control portion 74, and an input receiving portion 75.

The communication control portion 71 communicates with the server 60 via Internet or the like and receives guidance information or warning information output from the server 60. In addition, the communication control portion 71 outputs setting information, e.g., a destination, input from the input receiving portion 75, to the server 60.

The indication control portion 72 indicates the guidance information or warning information received by the communication control portion 71, on the indication portion 73. In addition, the indication control portion 72 makes a change of indication, e.g., a change of the menu screen or a change of the scale of the map, on the basis of operation information or the like input from the input receiving portion 75.

The indication portion 73 includes, for example, a liquid crystal display and an EL display, and indicates the guidance information or warning information received by the server 60 and buttons, a menu, or the like for operation.

The input control portion 74 outputs the operation information input from the input receiving portion 75, to the indication control portion 72.

The input receiving portion 75 includes, for example, a touch panel superimposed on the indication portion 10 and a push button, and receives an operation of input of a destination or the like from the user or the like.

The operation in the present example, in principle, is the same as those of the flowcharts illustrated in FIGS. 2, 9, 10 and 13. However, regarding the warning indication, the warning information is generated by the server 60 and is indicated on the portable terminal 70. The order from the user or the like while waiting for an order is input on the input receiving portion 75 of the portable terminal 70, and the server 60 makes a determination.

According to the present example, the server 60, for example, searches a route or generates alarming information. Therefore, the processing on the portable terminal 70 can be simplified, and even if the portable terminal 70 has low processing capability, for example, the guiding on the route or an alarm about the avoidance recommended region can be made.

In the fifth example, the subject of communication with the server 60 is not limited to the portable terminal 70, but any terminals with a communication control portion and capable of indication of an image may be used regardless of the presence or absence of portability. For example, an automotive display audio without a navigation function may be used.

In addition, in the five examples described above, alarming information is indicated on the indication portion. However, warning information may be output as sound from a speaker or the like or may be reported by means of both indication and sound.

In addition, in the five examples described above, the description was made on the basis of an avoidance recommended region with human-induced avoidance recommendation properties, e.g., accidents and crimes, as an avoidance recommended region. However, an area having the necessity of recommendation of avoidance due to natural disasters or the like may be an avoidance recommended region.

In addition, the present invention is not limited to the aforementioned examples. Specifically, those skilled in the art can carry out various variations without departing from the gist of the present invention according to conventionally known knowledge. The variations, of course, fall within the scope of the present invention insofar as they include the configurations of the navigation apparatus or navigation system of the present invention.

REFERENCE SIGNS LIST 1 navigation apparatus
2 communication control portion (avoidance recommended region acquisition device)
7 route control portion
7a route search portion (searching device, potential stop point extraction device, history information acquisition device)
10 indication portion (reporting device)
60 server (information processing device)
61 communication control portion (avoidance recommended region acquisition device, output device)
65 route control portion
65a route search portion (searching device, report information generation portion)
70 portable terminal (information report device)
71 communication control portion (receiving device)
73 indication portion (reporting device)

The invention claimed is:
1. A navigation apparatus comprising:
a searching device configured to search a route;
an avoidance recommended region acquisition device configured to acquire information about an avoidance recommended region, which is a region for which avoidance of passing is recommended;
a reporting device configured to report presence of the avoidance recommended region on a route searched by the searching device on a basis of the avoidance recommended region acquired by the avoidance recommended region acquisition device; and a passage history acquisition device configured to acquire history information, which is a history of passing an avoidance recommended region, wherein the reporting device reports presence of the avoidance recommended region on a basis of the history information, and wherein the information about the avoidance recommended region includes information about a frequent occurrence region of crimes.

2. The navigation apparatus according to claim 1, wherein the reporting device again gives a report when a route on which the avoidance recommended region is present is selected by a selection device.

3. The navigation apparatus according to claim 1, wherein the reporting device reports detailed information about the avoidance recommended region present on the route.

4. The navigation apparatus according to claim 1, wherein the reporting device carries out reporting depending on an avoidance recommendation degree of the avoidance recommended region.

5. The navigation apparatus according to claim 1, wherein the reporting device does not report the avoidance recommended region the history information of which has a predetermined value or more.

6. The navigation apparatus according to claim 1, wherein, in a case of straying off the route, the searching device searches a re-searched route, which is a route different from the route, and the reporting device carries out reporting on a basis of the avoidance recommended region on the re-searched route.

7. A navigation apparatus comprising:
   a current position acquisition device for determining a current position;
   an avoidance recommended region acquisition device configured to acquire information about an avoidance recommended region, which is a region for which avoidance of passing is recommended; and
   a reporting device configured to report that the navigation apparatus currently passing the avoidance recommended region when judging the navigation apparatus passing the avoidance recommended region based on the current position and the avoidance recommended region acquired by the avoidance recommended region acquisition device; and
   a passage history acquisition device configured to acquire history information, which is a history of passing an avoidance recommended region,
   wherein the reporting device reports presence of the avoidance recommended region on a basis of the history information, and
   wherein the information about the avoidance recommended region includes information about a frequent occurrence region of crimes.

8. The navigation apparatus according to claim 7,
   further comprising: a surrounding area searching device for searching surrounding facilities,
   wherein the reporting device judges whether currently passing the avoidance recommended region or not when searching the surrounding facilities.

9. An information reporting method for a navigation apparatus including a search process of searching a route, the information reporting method comprising:
   an avoidance recommended region acquisition process of acquiring information about an avoidance recommended region, which is a region for which avoidance of passing is recommended;
   a report process of reporting presence of the avoidance recommended region on a route searched by the search process on a basis of the avoidance recommended region acquired by the avoidance recommended region acquisition process;
   a passage history acquisition process of acquiring history information, which is a history of passing an avoidance recommended region,
   wherein the retorting presence of the avoidance recommended region is on a basis of the history information, and
   wherein the information about the avoidance recommended region includes information about a frequent occurrence region of crimes.

10. A non-transitory computer readable medium baying a computer program product wherein the information reporting method according to claim 9 is carried out by a computer.

* * * * *